(No Model.) 6 Sheets—Sheet 3.
J. THORNE.
TYPE SETTING AND DISTRIBUTING MACHINE.
No. 372,186. Patented Oct. 25, 1887.
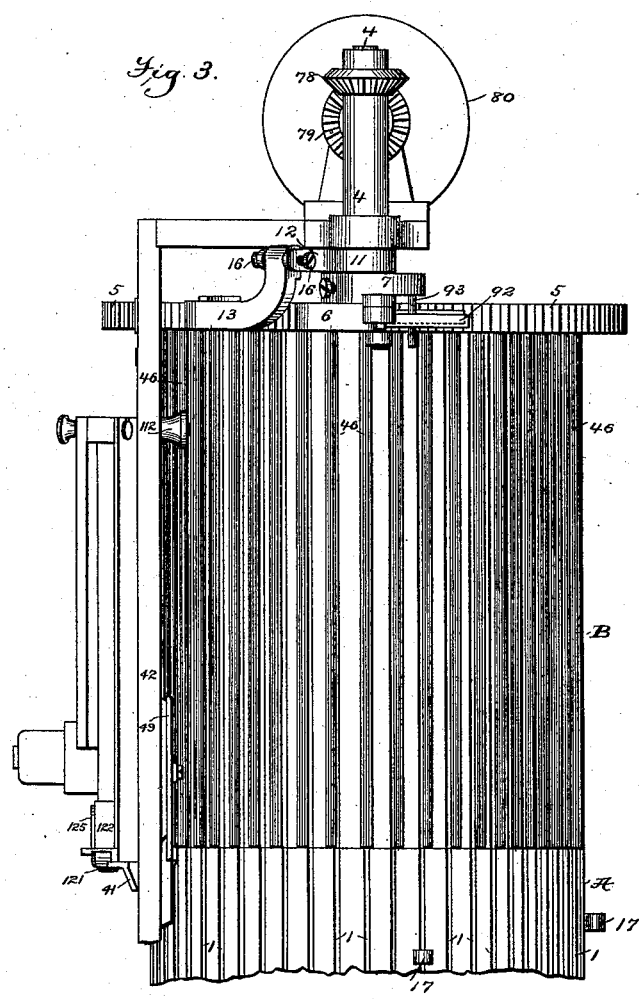
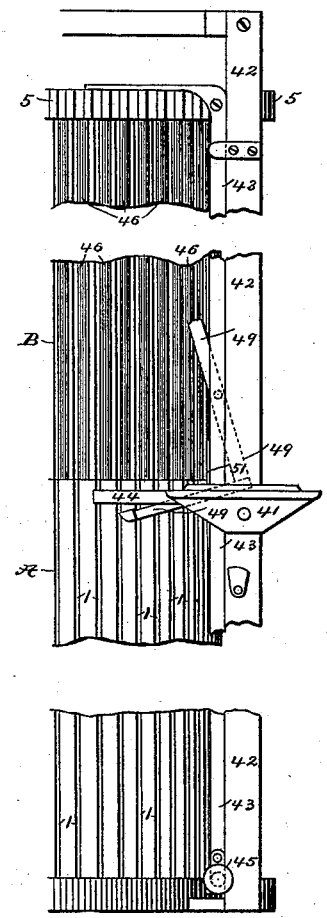
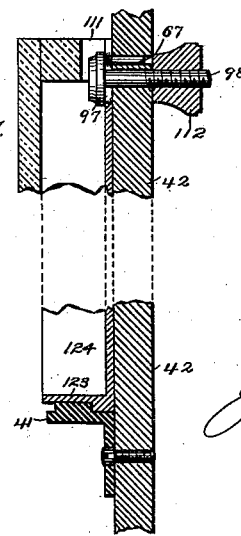

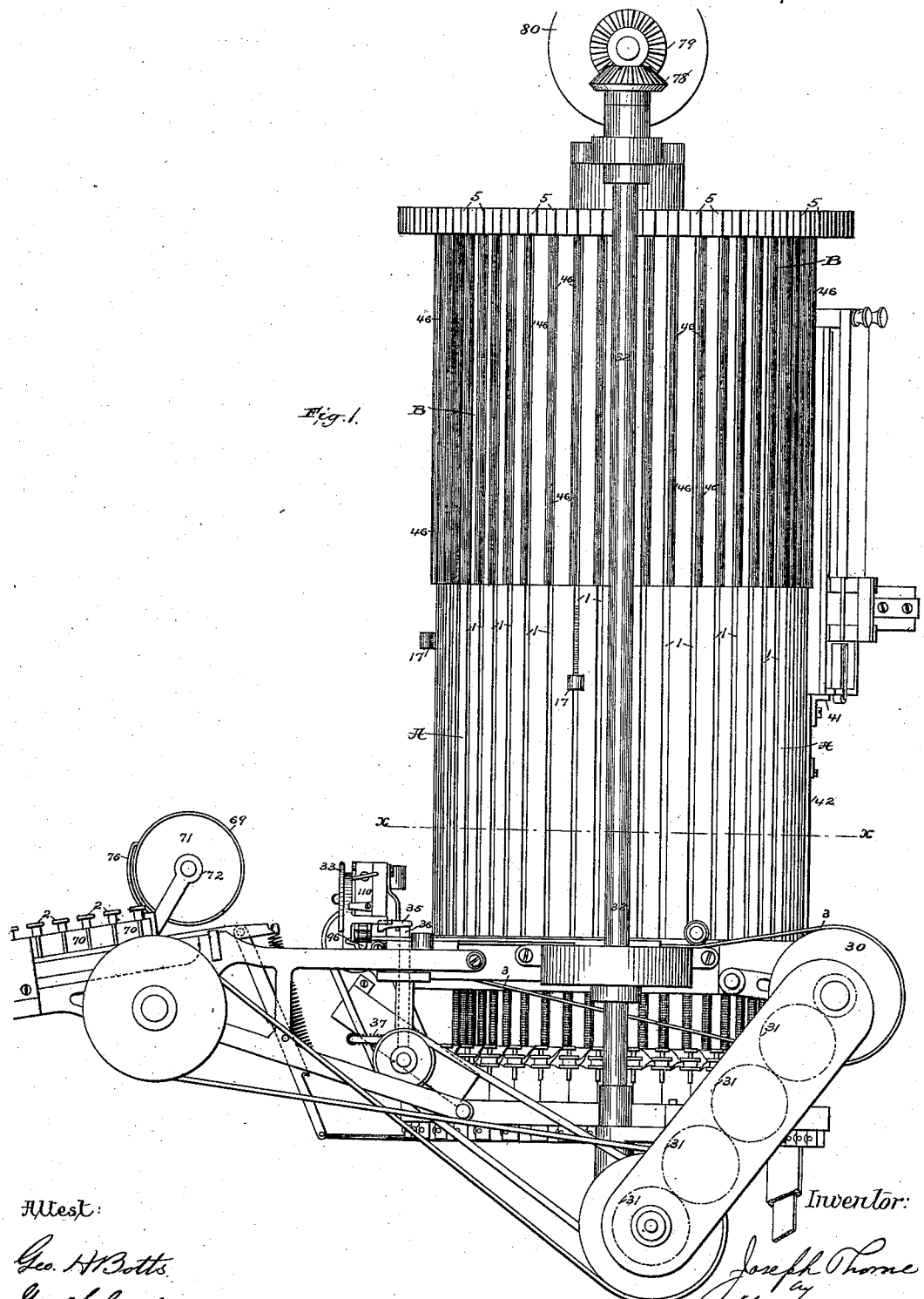

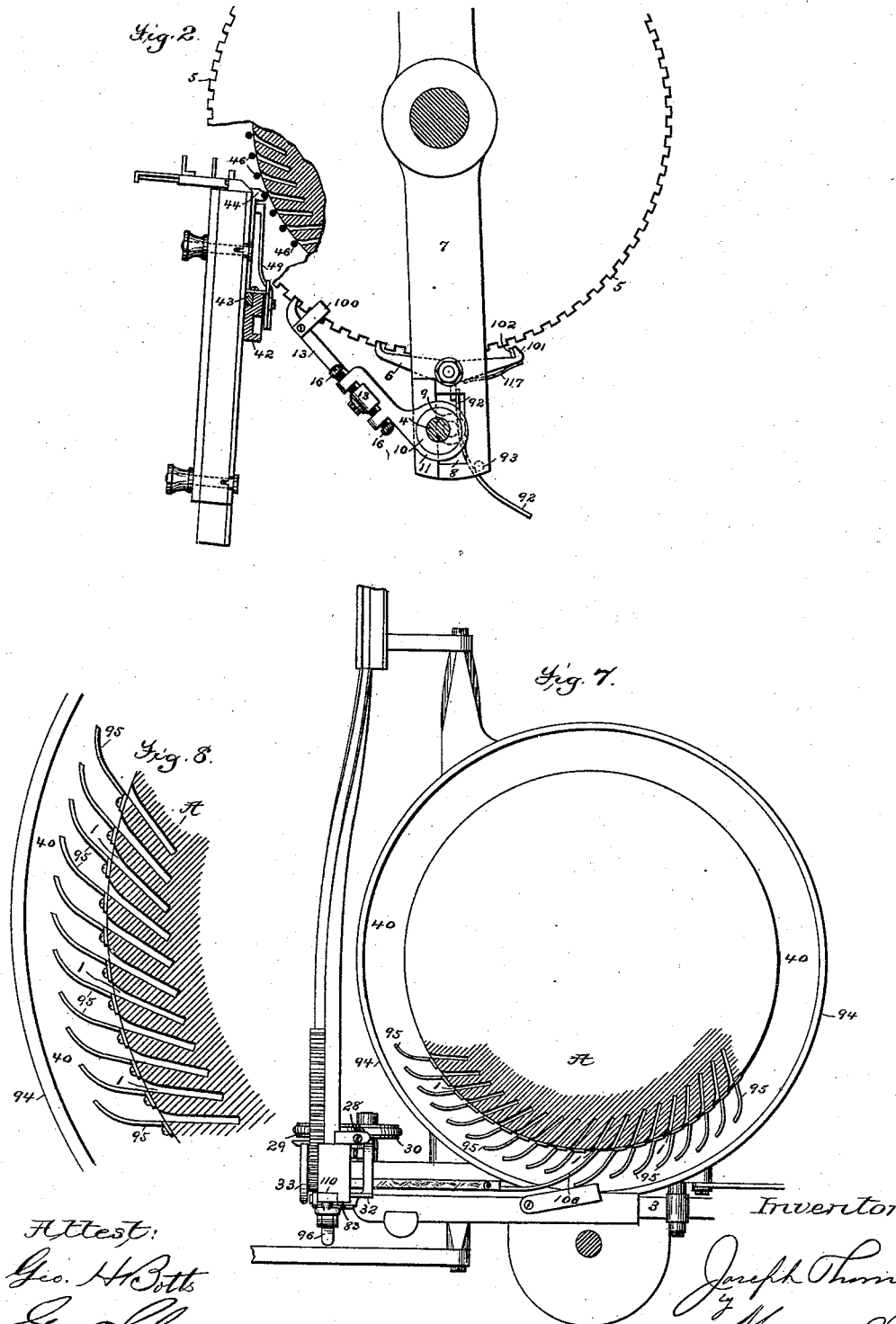

(No Model.)  6 Sheets—Sheet 4.
J. THORNE.
TYPE SETTING AND DISTRIBUTING MACHINE.
No. 372,186.  Patented Oct. 25, 1887.
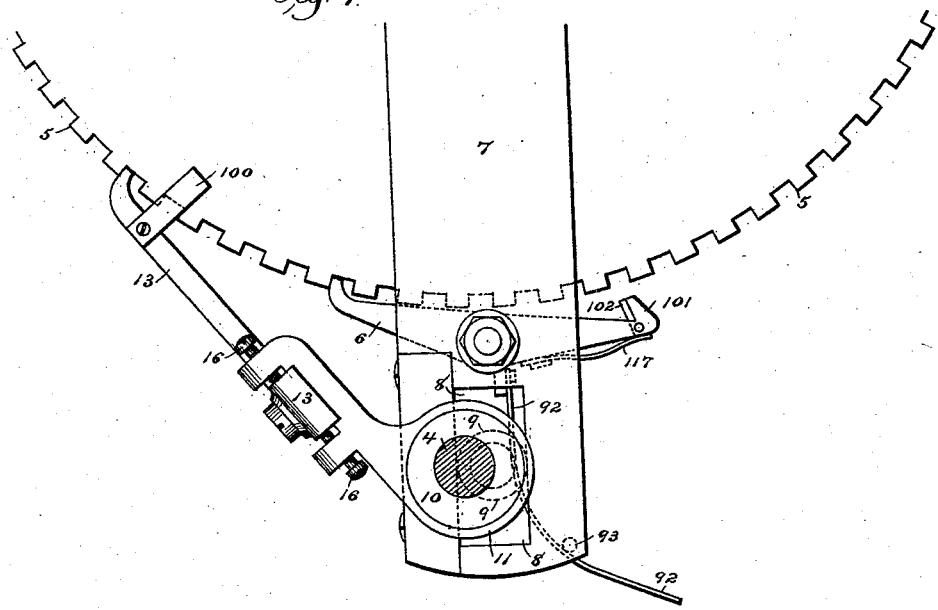
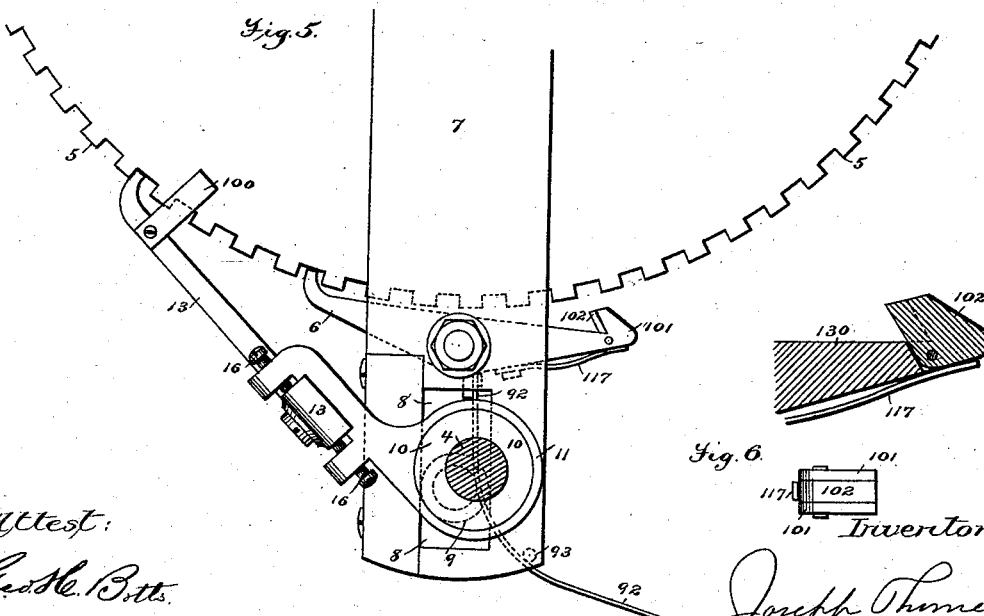
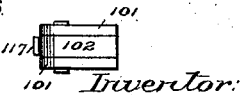

(No Model.) 6 Sheets—Sheet 5.
J. THORNE.
TYPE SETTING AND DISTRIBUTING MACHINE.
No. 372,186. Patented Oct. 25, 1887.
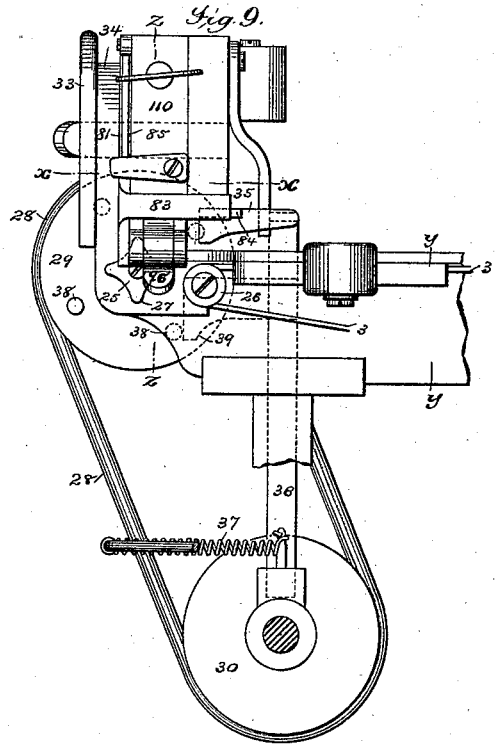
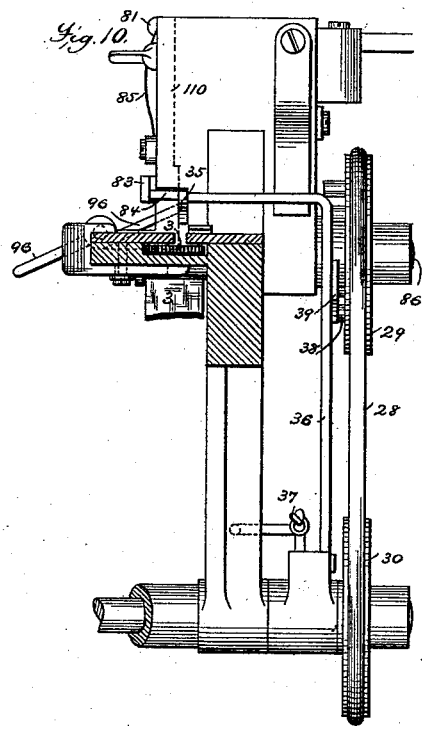
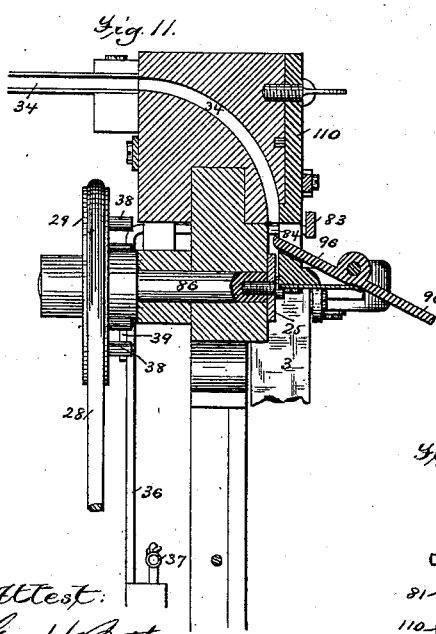
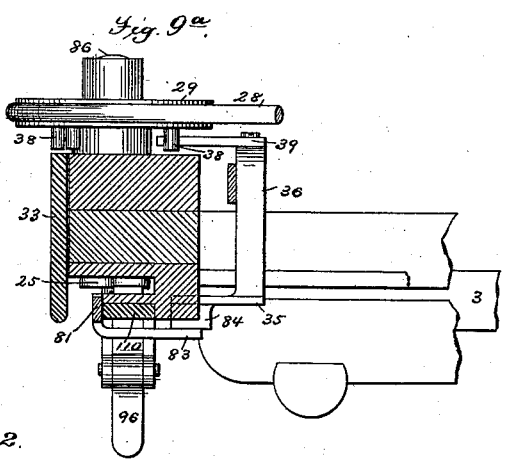
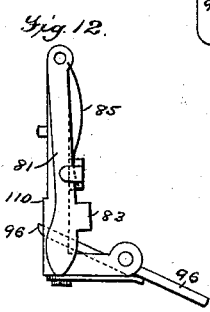

(No Model.) 6 Sheets—Sheet 6.
J. THORNE.
TYPE SETTING AND DISTRIBUTING MACHINE.
No. 372,186. Patented Oct. 25, 1887.
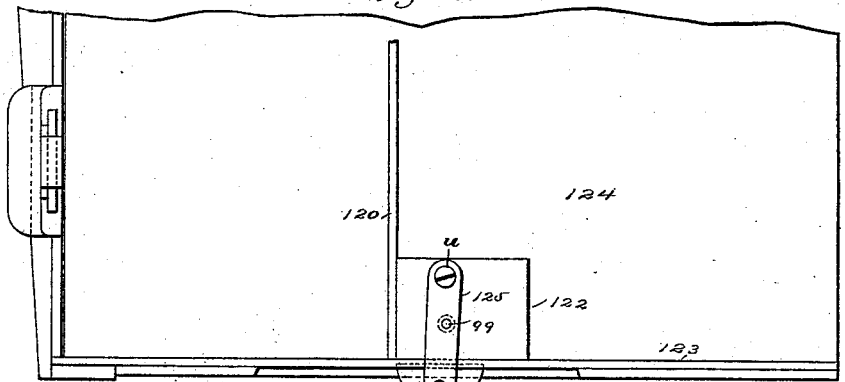
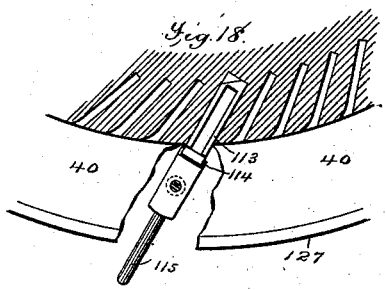
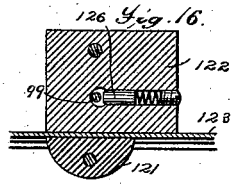
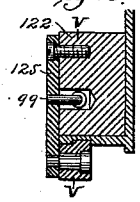
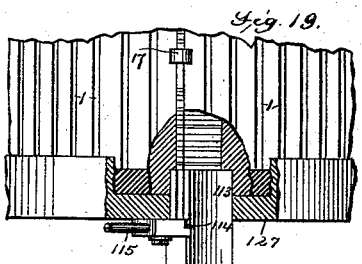
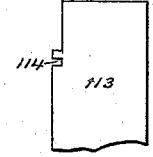
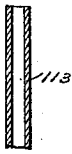
Attest:
Geo. H. Botts.
Geo. H. Graham.
Inventor:
Joseph Thorne
by Munson & Philipp
Attys

UNITED STATES PATENT OFFICE.

JOSEPH THORNE, OF PORT RICHMOND, NEW YORK.

TYPE SETTING AND DISTRIBUTING MACHINE.

SPECIFICATION forming part of Letters Patent No. 372,186, dated October 25, 1887.

Application filed June 4, 1885. Serial No. 167,599. (No model.)

*To all whom it may concern:*

Be it known that I, JOSEPH THORNE, a citizen of the United States, residing at Port Richmond, county of Richmond, and State of New York, have invented certain new and useful Improvements in Type Setting and Distributing Machines, fully described and represented in the following specification and the accompanying drawings, forming a part of the same.

These improvements relate particularly to that class of type distributing and setting machines which may be briefly described as follows: The distributing and setting cylinders are mounted vertically one above the other, the former rotating and the latter remaining stationary. Each cylinder has an equal number of angularly-arranged type-channels, in which the types rest upon their sides in vertical lines, so that when the bottom type of a line is removed the space it occupied is immediately filled by the descent of its line. The distributing-cylinder is caused to rotate by a step-like movement that intermittingly brings its channels to coincide with and momentarily rest directly over those of the setting-cylinder. Each character of type has edge-nicks differently arranged, so as to distinguish it from every other character or letter, and the upper or mouth end of each channel of the setting-cylinder is provided with wards correspondingly arranged, and hence only such types as are appropriate to a given channel in the setting-cylinder can pass into it from the distributing-cylinder. The lines of miscellaneous types (dead matter) to be distributed are inserted from time to time laterally from a special galley into the channels of the upper cylinder, and as these lines of type are brought to rest over the channels of the setting-cylinder all the lowermost types whose nicks correspond with the wards beneath them will drop into the channels of the setting-cylinder, types of like character being thus accumulated in their respective channels below, where they rest upon a bottom plate. In composing, the depression of a particular key selects the desired type, which is pushed from the bottom of its line out into a rapidly-revolving disk by means of a rotating driver that automatically operates the appropriate horizontally-moving ejector. The ejected types are centrifugally thrown edgewise by the revolving disk against a stationary guard-rail around its edge, which rail directs the types lengthwise in their circular travel and out onto a belt that conveys them to a revolving lifter, by which they are raised in succession into a long setting-stick that extends across the machine in front of the operator. Types successively ejected upon the disk as their appropriate keys are depressed thus unerringly follow each other in correct order onto the conveying belt and into the setting stick, wherein they accumulate or are composed into a long line, in which the faces of the types are presented to the operator as they are moved onward to the column-galley by the addition of each succeeding type. This setting-stick terminates at the upper end of an inclined galley, into which a section of the composed line of types is moved to form a column-line, which is justified by an assistant with spaces taken from a case above, and this case has chambers containing the different spaces, the lowermost of which are thrust part way out by ejectors operated by a foot-lever. A chute is provided for the introduction, by hand, of odd sorts to the line-forming mechanism, and the setting-cylinder has a pi-channel to receive them during distribution. Sorts running short may be readily supplied to and overrunning sorts conveniently removed from the cylinders. The moving mechanisms are all positively driven, but require such light power that the slightest obstruction will suspend it. A machine of this character is illustrated in Letters Patent No. 232,157, dated September 14, 1880, and No. 283,934, dated August 28, 1883, to which reference may be made in aid of the description of the present improvements, letters of reference being applied in the present case like those used to designate corresponding parts in the last-named patent.

The present improvements are fully illustrated in the accompanying drawings, where-in—

Figure 1 is a side elevation of a type setting and distributing machine to which these improvements are applicable. Fig. 2 is a plan view showing more particularly the driving mechanism of the distributing-cylinder. Fig. 3 is an elevation of the distributing-cylinder, the view being taken from the side opposite to that shown in Fig. 1. Figs. 4 and 5 are enlarged plan views of the improved driving mechanism for the distributing-cylinder in two positions. Fig. 6 is an enlarged detail thereof. Fig. 7 is a sectional plan view taken on the line $x$ of Fig. 1, and shows more particularly the guides arranged over the revolving carrying-table and forming type-guiding ways. Fig. 8 is an enlarged view of the guiding-ways. Fig. 9 is a side elevation; Fig. 9$^a$, a horizontal section taken on the line $x$ of Fig. 9; Fig. 10, a sectional elevation taken on the line $y$ of Fig. 9, looking toward the key-board. Fig. 11 is a sectional elevation on the line $z$ of Fig. 9, looking away from the key-board, and Fig. 12 an elevation of one of the parts, which figures illustrate the construction and operation of an improved means for sustaining the types when elevated from the driving-belt into the chute. Fig. 13 is a side elevation of part of the machine, showing in part the improved means for sustaining the galley and loading-channels of the distributer. Fig. 14 is an enlarged elevation of the lower portion of the type-galley, which is shown by a plan view in Fig. 2 and by a side elevation in Fig. 3. Fig. 15 is a section on the line $u$ of Fig. 14, and Fig. 16 a section on the line $v$ of Fig. 15, and Fig. 17 is a detail showing the mode of securing the galley. Fig. 18 is a plan view showing the pi-channel of the setter and the means for removing the types therefrom. Fig. 19 is an elevation, partly in section. Fig. 20 is a plan view, and Fig. 21 a side elevation, and Fig. 22 a sectional elevation, of the pi-guide and its plunger.

One branch of the invention relates to improvements in the means for imparting to the distributing-cylinder B a step-like intermittent movement to bring its channels 1 to coincide with those of the setting-cylinder A.

Heretofore the forward step-like movement was imparted to the distributing-cylinder B by means of a ratchet-wheel, 5, fast to said cylinder, the teeth of which wheel are engaged by a ratchet, 6, pivoted to an oscillating arm, 7, the end of which is provided with a slot, 8, in which works a crank-pin, 9, of a driving-shaft, 4, (see Figs. 1, 2, 3,) which is actuated in a manner illustrated in my prior Letters Patent, hereinbefore referred to. Formerly this driving mechanism was designed to be so adjusted that the distance to which it should advance the distributing-cylinder at each movement would be exactly equal to the distance between any two of its type-channels, and thus bring the said cylinder into a state of rest at the end of each step-like movement, with its channels in exact coincidence with those of the setting-cylinder. It was found, however, in the practical operation of the machine, that to depend upon obtaining an exact coincidence between said channels by a single movement caused a defective operation, and an improvement was effected by which each onward progressive step-like movement of the distributing-cylinder was rapidly made and covered a distance greater than that between channel and channel, and means were provided for giving to said distributing-cylinder after each such rapid step-like movement a retrograde movement, whereby it was slowly moved backward to accomplish the coincidence between the channels of the two cylinders, whereby a more certain and reliable passage of the proper types from the distributing to the setting cylinder was accomplished; but this improvement has been found to have objections, among which is an unnecessary movement of the distributing-cylinder, tending to wearing of the parts which are so constantly moved when the machine operates. Another defect is that the movement requires the passage of the channels of the distributing-cylinder over and beyond those of the setting-cylinder before the said channels are brought at rest into coincidence, thus affording such types as have nicks corresponding with some of the channels passed over to have a tendency to enter said channels during the rapid movement of the distributing-cylinder, which types, even if they partially descend, cause a clogging obstruction that will either stop the machine or injure the types.

In order to attain perfect register between the channels of the two cylinders at the end of each forward movement of the distributing-cylinder, the following improved devices are used: The arm 7 is, in addition to the main driving-pawl 6, supplied with the auxiliary driving-pawl 13, which, like the pawl 6, engages with the teeth of the ratchet-wheel 5. This pawl 13 is adjustable, by means of screws 16, in an arm, 12, that is hung upon the shaft 4 by a band, 11, that embraces an eccentric, 10, and it is sustained in proper relative position to the wheel 5 by means of a bearer, 100, that maintains it in a proper working plane. The crank-pin 9 and the eccentric 10 on the shaft 4 are so related that after the forward driving movement of the arm 7 is finished and the driving action of the pawl 6 is complete, as in Fig. 4, a slight forward movement of the pawl 13 will be slowly made, thus bringing the parts into the position shown in Fig. 5, the extent of the movement of the pawl 13 being nicely adjusted, by means of the screws 16, to accurately move the distributing cylinder so as to bring its channels into exact alignment with the channels of the setting-cylinder, and thus effectually secure the passage of the types from channels in the one cylinder into channels in the other cylinder. In the retrograde movement of the arm 7 and the pawls 6 13 these pawls will, by reason of their curved structure, drag over the teeth of the wheel 5 and re-engage appropriate teeth to accomplish a second onward movement of the distributing-cylinder.

Another improvement consists in the means for imparting to the distributing-cylinder a forward movement having an extent less than is required to bring the channels of the distributing-cylinder into coincidence with those of the setting-cylinder. This consists in a pawl, 101, fast on the arm 130, carrying the pawl 6, but provided with a central tongue, 102, that projects beyond the pawl. This tongue 102 is pivoted to said arm 130, and is provided with a spring, 117, which holds the tongue 102 constantly pressed forward, so that said pawl, with its projecting tongue, can only be entered between two teeth of the wheel 5 after a full onward step-like movement has been imparted to the cylinder B. When the driving-spring 92 is in contact with the driving-pin 93 on the arm 7, the pawl 101 will be held out of engagement with the teeth of the wheel 5, while the pawl 6 will be held in engagement with the said wheel. When, however, the spring 92 is moved out of contact with the pin 93, which can only be done after a complete forward throw of the cylinder B, the pawl 6 will be thrown out of engagement with the teeth of wheel 5. The pawl 101, with its projecting tongue 102, may then be entered into engagement with the teeth of the wheel 5, either by backward pressure upon spring 92 or by pressure upon the arm 130, the result of which will be that as the next forward movement of the arm 7 takes place the wheel 5 will be moved forward by the pawl 101, carrying with it the cylinder to a distance that will bring the channels of the cylinder B half-way between the channels of the cylinder A, said pawl 101 making a throw that is half as great as that of the pawl 6, for the reason that its projecting tongue is pressed rearward without moving the cylinder, and the solid pawl alone drives. The distributing-cylinder is thus moved into a position for receiving its load of types to be distributed, the channels of said cylinder then having beneath them a solid foundation for each line of types to rest upon, whereby all injury to the types or to the wards at the mouths of the channels of the cylinder A will be avoided. When this half step-like forward movement is complete, the pawl 6 will be in a position over the top of one of the teeth of the wheel 5. When the arm 7 makes its rearward movement, it will throw out the pawl 101, and the spring 117 will immediately project the tongue 102, thereby preventing said pawl from again engaging between teeth of the wheel 5, for the reason that since only a half-stroke forward of the cylinder B has been made said tongue will then engage the top of a tooth and prevent the pawl entering between two teeth. When one channel of the distributing-cylinder B has been loaded with a line of type, the remaining half of a whole step-like forward movement must be made before the teeth of the wheel 5 will again be in position to be engaged by the pawl 101. This is accomplished by the pawl 6, which, making a full stroke, engages a tooth of the wheel 5 only during the last half of said movement, (because of the position to which the teeth of wheel 5 have been moved by the pawl 101,) and thus acts to complete the whole stroke or step-like movement, one-half of which was performed by the pawl 101. Thus the cylinder B is again brought into position with its channels coincident with those of the setting-cylinder, whereupon such types as overlie their appropriate channels will pass into the channels of the setting-cylinder. If, now, it is desired to load another channel of the distributing-cylinder with a line of type, the pawl 101 is again entered between teeth of the wheel 5, which is again in position to receive said pawl and its projecting tongue, and the half step-like movement of the cylinder B will be accomplished as before. The completing half-stroke by means of pawl 6 must then take place, and these operations will be repeated as long as may be desired.

It is manifest that as a whole step like forward movement by the pawl 101 would cause channels of the distributing-cylinder to pass from midway between two channels of the setting cylinder to points midway between two channels, or, in other words, cause the channels of the cylinder B to pass completely over channels of the setting-cylinder, in which case types finding their proper channels would tend to descend therein and cause a block or damage, from a consideration of which the advantages and importance of the structure and operation of the pawl 101 will be apparent.

As the ejectors which push the types onto the disk or table 40 are positively moved by a rotating driver, it sometimes happens that the ejected type will have its face forcibly carried against the rail or rim 94, surrounding or forming a pathway about said table, and thus be battered or injured. To avoid this defective action, due either to the tangential movement of the types forcibly imparted by the ejector or to any part of the movement imparted by the centrifugal action of the disk, I have provided each of the channels in the setting-cylinder, at a point just over said disk or table at the bottom of each of said channels, with a finger, 95, which fingers thus form a series around said cylinder and constitute pathways, in effect extending the type-channels 1 outwardly over said disk or table, and as these fingers 95 are flexible and curved, so as to gradually turn the ejected type and give it a direction nearly parallel with the said rail, it follows that each type ejected will assume such a position, when it comes wholly within the control of the revolving disk or table, that it is so nearly parallel with said rim or rail that nearly if not the entire side of the said type will bear against the rim or rail, thus relieving the face of the type from direct contact with said rim or rail. These fingers do not extend so close to the rim or rail as to interfere with the onward travel of the types to the conveying-belt 3 after they clear the fingers; but, on the contrary, there is provided beyond their ends a passage-way in which the types travel until they are guided to the belt 3 by the deflector 106.

Another improvement consists in the means for transferring the types from the conveying-belt 3 into the setting-stick 34.

Formerly a revolving type-carrying wheel and a rigid type-elevator, to which the types were directed by an inclined chute, were wholly depended upon for this purpose. This structure was improved by the use of a small revolving type-lifter, 25, having a series of radial wings, 27, and actuated by a belt, 28, moving over pulleys 29 30, fast on the shaft 86 of the lifter 25, which construction enabled the chute to be dispensed with and the conveying-belt 3 to run over a pulley, 26, on a level direct to the type-lifter.

In practice it is found that when a type which has been raised by one of the wings 27 of the lifter 25, and said wing retires as the next type is being raised, the advance types will descend onto the advancing type, thus subjecting the latter to abrasion and imposing upon the lifter the duty of raising not only the last type, but a considerable portion of the composed line. To remedy this defective performance and enable each type to be retained in the position to which it is advanced by the lifter, I have provided a supporter, 96, (see Figs. 9, 10, 11,) which is a lever-like device pivoted to have slight vertical play. It is arranged with its inner or operative end protruding through the removable side plate, 110, and slightly into the chute of the setting-stick 34 at a point just above the wings of the lifter 25. The outer end of the supporter 96 might be weighted to so counterbalance it that, while it may easily move, gravity will cause its inner end to press upon the side of the type; or a spring, as shown, may be a means for more positively operating it. As each type is lifted by a wing 27 of the lifter 25, it will press against the inner end of the supporter 96, which, readily moving slightly upward and rearward, permits the type to be easily raised. When, however, the wing 27 of the lifter leaves this type, the supporter 96 will slightly move downward, and pressing laterally against the side of the type securely hold it and prevent it or the type above it from descending, thus causing a type-space below the formed line to be free for the reception of the next type projected lengthwise into it by the operation of the belt 3. This supporter also acts to even the formed line, as it presses each type passing it into contact with one wall of the chute or channel of the composing stick.

As types vary in thickness and the throw of the lifter is always the same, and the pressing-surface of the supporter must be somewhat above the highest point reached by a wing of the lifter, it follows that very thin type will not be carried into the entrance of said supporter. To support and hold such thin type I have provided an auxiliary supporter or frictional bearer, which is composed of a narrow lever-like bearer, 81, pivoted to swing and normally pressed forward by a spring, 85, into the setting-stick 34. It is provided with a right-angular projecting arm, 83, which has an inclined face that is borne upon by projection 84, fast to the striker 35. When the types in the line receive an additional type and the striker 35 moves said type forward into true position longitudinally, the spring-pressed auxiliary supporter or frictional bearer is in position to be borne against by the type, it having a projecting face at such a point as will bear against and hold the thinner type. When such type and those above are thus secured and another type is added to the line, said auxiliary supporter is pressed out of action by means of the projection 84, carried by the striker 35, and is thus removed from the type-channel, so as to prevent an incoming type from being marred by abutting against it.

The side plate, 33, forms the wall against which the face of the type is guided; but the stock of the machine supporting the parts where the line is formed is cut away a sufficient distance to expose a considerable portion of the heads of the type, whereby the formed line may be constantly seen as it is composed. This is also an important improvement, as it admits the discovering by inspection of any faulty action of the elevator and line-forming devices.

An improvement has also been made in the loading-galley, by which the type-channels of the distributing-cylinder are supplied with lines of type, and in the means for securing said galley in its upright position before said cylinder.

Figs. 14 to 16 illustrate the first improvement. It consists in providing the follower 120 of the galley with a catch-block, 121, that permits the follower to easily move forward, and yet prevents a retrograde movement whereby the matter in the galley would become pi. This structure consists of a rest-block, 122, to which the follower 120 is attached, which block is guided on the ledge 123 and bottom plate, 124, of the galley. The catch-block 121 has a rib that rides in a channel cut into the under side of the ledge 123, and is connected to the rest-block 122 by a pivoted hanger, 125, that is constantly pressed forward by a spring-seated bolt, 126, having contact with a pin, 99, that projects inwardly from said plate 125. These devices so co-operate that while the whole may move freely forward the rest-block 122 and catch-block 121 are constantly clamped upon the bottom ledge of the galley, and any rearward movement of the follower 120 is prevented by their locking action.

As a means for readily securing the galley in place and conveniently removing the same when supported upon the bracket 41, its upper end is slotted, as at 111, (see Fig. 17,) to receive the head 97 of a bolt, 98. The screw-nut 112 tightens this bolt, and when released a spring-seated follower, 67, thrusts the bolt forward, so that the galley may be readily disengaged from it. To remove the galley the nut 112 is loosened. This will permit the galley to be raised, so as to free its bottom from the seat formed on the bracket 41.

I have, furthermore, provided a means for removing the matter from the pi-channel of the setting-cylinder. This is illustrated by Figs. 18 to 22. That part of the bottom plate, 127, of the machine which underlies the pi-channel 1 of the setting-cylinder A is perforated to admit the end of a pi-tube, 113, and this tube is provided with a slot, 114, into which the end of a swinging lever, 115, may engage to hold the pi-tube in place when a line of pi is to be removed. The pi-tube is provided with a plunger, 116, that may be slid in the pi-tube when the line of type is to be received or ejected, it being understood that it is moved downward in receiving the line of pi, and when the pi is removed it is thrust upward to discharge the contents of the tube. Previous to withdrawing this tube, after it has received the pi-line, a follower, as 17, is inserted in the pi-channel of the setting-cylinder, upon which the line of pi-type will accumulate and be prevented from falling out of the channel in the absence of the pi-tube. This follower 17 is of the same character as shown and described in my said patent No. 283,934, and hence requires no extended description here.

What is claimed is—

1. The combination, with the distributing-cylinder and a driving-pawl having a throw less than will move the same a distance equal to that between its type-channels, of an auxiliary pawl, as 13, having the slight throw necessary to complete a movement of said cylinder equal to said distance, substantially as described.

2. The combination, with the cylinder B and its wheel 5, of the pawl 6 and pawl 13, each having an operating-throw less than sufficient to accomplish a single forward step-like movement of said cylinder, but together operating to accomplish said single forward movement, substantially as described.

3. The combination, with the distributing-cylinder and its pawl-and-ratchet mechanism for advancing it step by step to bring its channels into coincidence with the channels of the composing-cylinder, of an auxiliary pawl, 101, arranged to be put into operation to advance the distributing-cylinder an additional part of a step and leave its channels between the channels of the composing-cylinder, substantially as described.

4. The combination, with the distributing-cylinder and its wheel 5, of an arm, as 7, carrying pawls 101 6 13, the pawl 101 operating to move said cylinder one-half the distance between its channels for the purpose of loading the channels of the distributing-cylinder, and the other pawls, 6 13, operating to complete that distance, substantially as described.

5. The combination, with the distributing-cylinder and its wheel 5, of a pawl, 101, having a spring-seated tongue, 102, substantially as described.

6. The combination, with the distributing-cylinder and its wheel 5, of an actuating-arm, 7, a pawl, 101, having spring-seated tongue 102, and a pawl, 6, substantially as described.

7. The combination, with the type-lifter 25 and the setting-stick 34, of the type-supporter 96, substantially as described.

8. The combination, with the type-lifter 25 and setting-stick 34, of the frictional bearer 81, substantially as described.

9. The combination, with the type-lifter 25 and setting-stick 34, of the type-supporters 96 and 81, substantially as described.

10. The combination, with the setting cylinder or case A and a type-channel therein which is extended through the bed-plate, of a removable pi-tube, 113, substantially as described.

11. A pi-tube, as 113, having a head adapted to enter the bottom of a channel in the cylinder A, a locking-slot, 114, for securing it in place, and a plunger, 116, substantially as described.

12. The combination, with the cylinder A, its channel 1, and locking-lever 115, of a pi-tube, 113, having locking-slot 114, substantially as described.

13. In a type-distributing machine, the combination, with a bracket for supporting a type-galley, of a type-galley having a holding-slot, as 111, and a locking-bolt, 98, operated by a spring-seated plunger, 67, substantially as described.

14. A type-galley constructed and adapted for loading a type-distributing machine with lines of type, having a follower, 120, provided with a supporting device consisting of a rest-block, 122, and catch-block 121, connected by a hanger, 125, operated by a pin, 99, and bolt 126, substantially as described.

In testimony whereof I have hereunto set my hand in the presence of two subscribing witnesses.

JOSEPH THORNE.

Witnesses:
T. H. PALMER,
GEO. H. GRAHAM.